F. Douglas.
Globe-Valve.
Nº 75670. Patented Mar. 17, 1868.
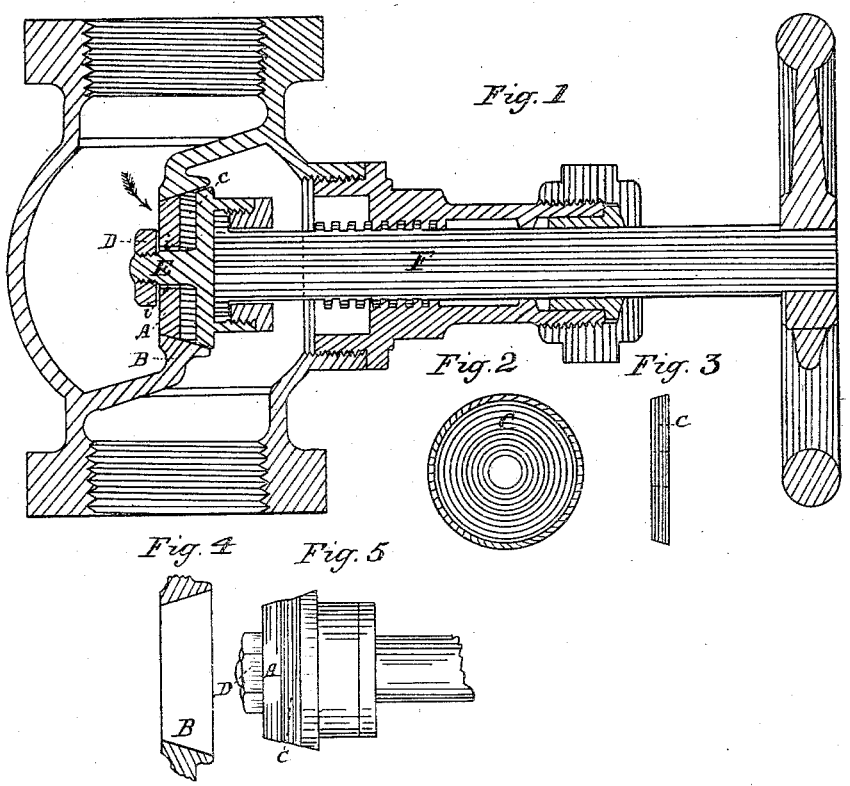

United States Patent Office.

FRANK DOUGLAS, OF NORWICH, CONNECTICUT

Letters Patent No. 75,670, dated March 17, 1868.

IMPROVEMENT IN GLOBE-VALVES.

*The Schedule referred to in these Letters Patent and making part of the same.*

TO ALL WHOM IT MAY CONCERN:

Be it known that I, FRANK DOUGLAS, of Norwich, in the county of New London, and State of Connecticut, have invented a new and improved Globe-Valve; and I do hereby declare that the following is a full, clear, and exact description of the same, reference being had to the accompanying drawings, making a part of this specification, in which—

Figure 1 is a vertical sectional drawing, representing the valve cut through the centre.
Figure 2 is a view of lower side of flexible ring, showing the hole in centre.
Figure 3 is an edge view of flexible ring.
Figure 4 is a sectional view of valve-seat.
Figure 5 is a view of valve raised from seat.

Similar letters of reference indicate corresponding parts or figures.

The nature of my invention consists in a flexible or expansive valve or seat that will tighten by the pressure of steam, water, gas, and other substances, or by the action of the valve-screw.

To enable others skilled in the art to make and use my invention, I will proceed to describe its construction and operation.

E is a valve-stem, on which is placed the rubber or flexible ring C, and also brass ring A, said rings being held in their place by nut D. B is the valve-seat upon which ring A is ground to a seat. Under nut D, in ring A, are little channels $i$ $i$, for the admission of steam or water. F is a screw-valve, upon which valve E turns freely.

The operation is as follows: When the screw-stem F is turned down, ring A comes in contact with seat B, and forms a joint as tight as the ordinary metallic valve; but by a slight turn farther of screw F, or a pressure against ring A from upper portion of globe, (as indicated by the arrow,) ring A is forced up on stem E away from nut D, causing flexible ring C to expand tightly against seat B, and thereby making a perfectly tight joint. By means of the little channels $i$ $i$ in ring A, metallic rings in place of the flexible ring may be made to expand to a joint by the action of pressure. Vulcanite or hard-rubber ring C, figs. 2 and 3, may be used for steam, as it becomes sufficiently flexible under steam heat. In this valve we have all the advantages of the ordinary metallic valve, with the combined advantage of a flexible ring that is forced to a joint by the action of the pressure, and the greater the pressure the more perfect the joint. The flexible ring may be applied to the seat B instead of valve E, and have the same effect.

I do not claim a valve made with a rubber ring or disk on its under side in such a manner that the action of the valve-screw will press it down on a seat, and also in such a manner that the action of steam or increased pressure from under side of valve would tend to compress said rubber ring, force it away from its seat, and thereby make it leak, as that has been patented; but What I do claim, and desire to secure by Letters Patent, is—

1. The arrangement of the flexible ring C to form a valve, when compressed between ring A and ring or valve E, in such a manner as to expand ring C in diameter, to form a tight joint, substantially as specified.

2. The arrangement of the metallic ring A with channels $i$ $i$, for the purpose herein specified.

FRANK DOUGLAS.

Witnesses:
GEORGE C. SWEET,
ALBERT S. BOLLES.